United States Patent Office 3,008,558
Patented Nov. 14, 1961

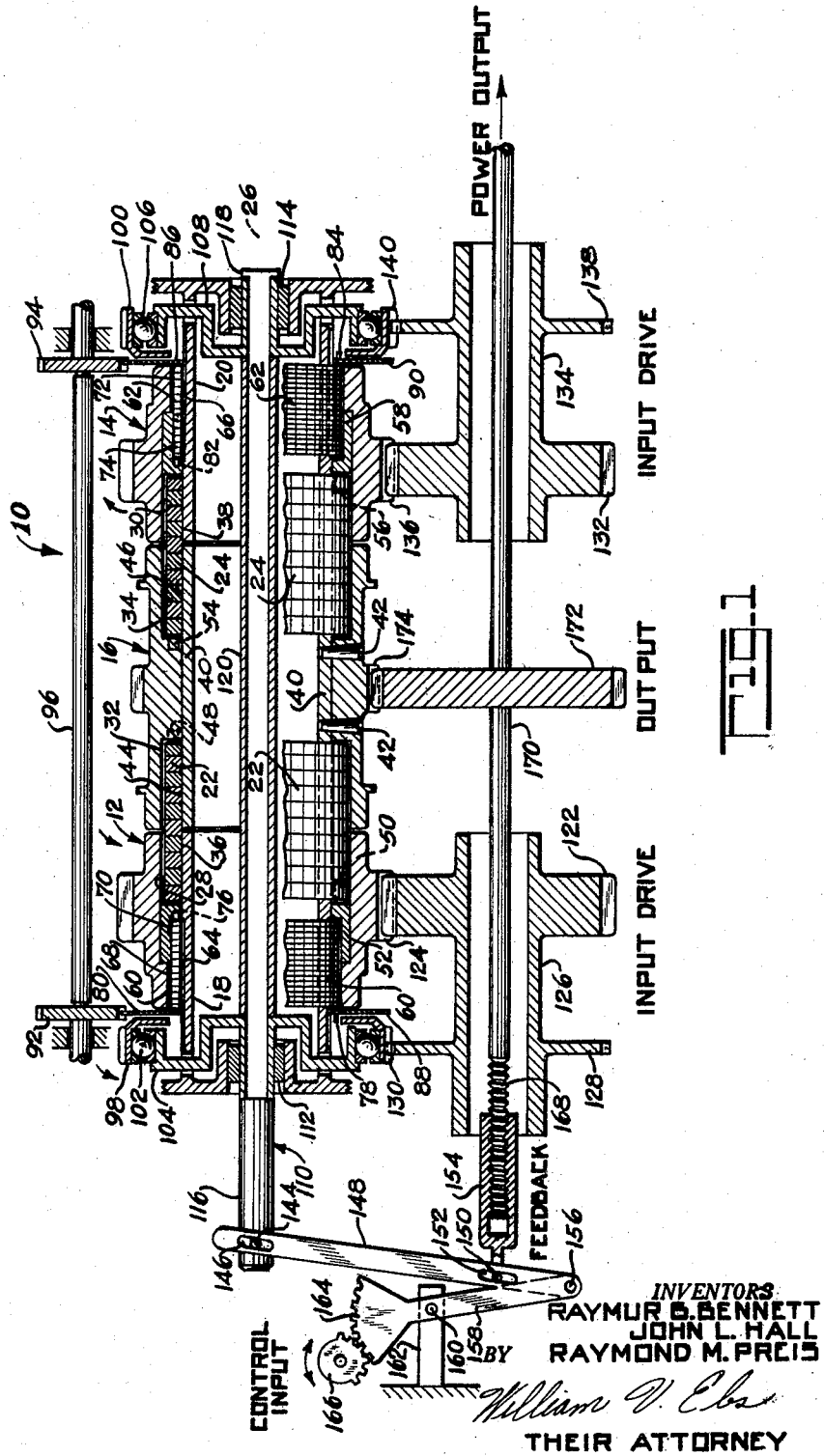

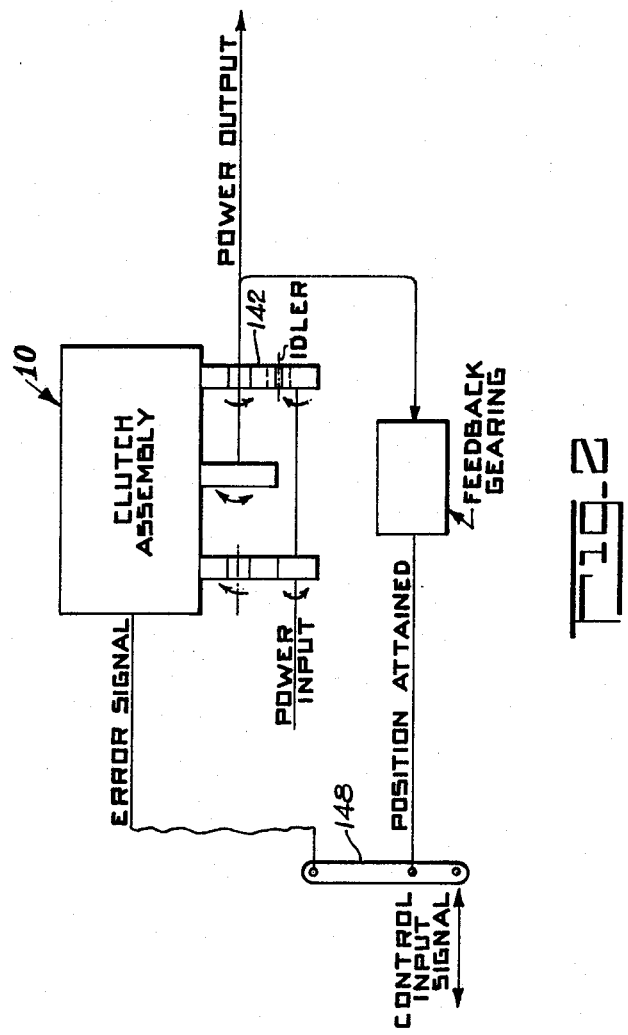

3,008,558
POWER TRANSMITTING DEVICE WITH SPRING CLUTCH MEANS
Raymur B. Bennett, Packanack Lake, John L. Hall, Hanover, and Raymond M. Preis, Caldwell, N.J., assignors to Curtiss-Wright Corporation, a corporation of Delaware
Filed July 9, 1958, Ser. No. 747,409
11 Claims. (Cl. 192—12)

Our invention relates to a power transmitting device having spring clutch means. More particularly the invention relates to such a device which is arranged to prevent negative output torque from being transmitted back through the mechanism of the device.

Power transmitting devices may incorporate spring clutches of the type comprising precision wound and ground helical springs, which tighten or loosen their grip on cylindrical surfaces in response to forces which tend to wind or unwind them, and it is this type of spring clutch which is utilized in the device described herein. If such a clutch is constructed with the spring between inside and outside walls of two concentric cylindrical members, the spring will engage the outer diameter of the inside member when a force is applied tending to wind the spring, and will engage the inside diameter of the outer cylindrical member when a force is applied tending to unwind the spring. An arrangement of this sort is used in the device disclosed herein to achieve the objects of the invention.

One object of the invention is to provide a power transmitting device having spring clutch means arranged for braking an output member upon the application of negative torque thereto by locking such member to fixed structure, and for causing rotation of the output member at other times by locking the member to a rotating input member.

Another object of the invention is to provide such a device which includes a pair of input members and an output member arranged for bidirectional control and braking of the output member.

Still another object of the invention is to provide a novel arrangement in a spring clutch type of power transmitting device for rendering the mechanism operative upon the application of very small input signals thereto.

Various other objects and advantages of the invention will become apparent during a reading of the specification.

In carrying out the invention a helical spring of rather precise dimensions is disposed in a power transmitting device between parts on one side of the spring wall constituting input and output members of the unit, and fixed structure and part of the output member on the other side of the wall. The output member, upon the application of negative torque thereto, actuates the spring to lock the output member to the fixed structure preventing rotation of the output member. Suitable means are provided for actuating the spring in the other direction, the effect of which is to lock the output member to an input member by means of which the output member may be rotated. By utilizing two input members and two main springs in combination with the output member and fixed structure, the output member may be braked against rotation in either of two opposite directions or be caused to rotate with one or the other of the input members in either of the opposite directions.

Referring to the drawing:

FIG. 1 is a longitudinal vertical sectional view somewhat diagrammatic in character showing the device of the invention and proposed associated control elements therefor, FIG. 2 is a block diagram of the device and associated controls.

In the drawings, reference character 10 denotes the transmission device of the invention. Such device includes two rotatable input members 12 and 14, a rotatable output member 16, fixed structures 18 and 20 which may be integral parts of the housing of the device, and two main springs 22 and 24. The output member 16 is located between the two input members 12 and 14, all such members having a common axis of rotation 26. Suitable bearings (not shown) are provided for the rotatable members 12, 14, and 16.

Input members 12 and 14 are formed with inside cylindrical surfaces 28 and 30 extending over a portion of the length of each part to ends adjacent the output member. Output member 16 is formed with inside cylindrical surfaces 32 and 34 extending over portions of the length of the part to opposite ends adjacent the input members 12 and 14 respectively. All of these cylindrical surfaces 28, 30, 32 and 34 are of substantially the same diameter.

The fixed structures 18 and 20 are cylindrical and coaxial with the input members 12 and 14 and output member 16. Such fixed structures have outside cylindrical surfaces 36 and 38 which are spaced from and opposite cylindrical surfaces 28 and 30 respectively of the input members. A cylindrical member 40 is affixed as by dowels 42 to output member 16 for rotation with the output member. Such cylindrical member 40 has opposite ends adjacent the fixed structures 18 and 20, and has outer cylindrical surfaces 44 and 46 spaced from and opposite cylindrical surfaces 32 and 34 of the output member. The cylindrical surfaces 36, 38, 44 and 46 are all substantially the same diameter.

As shown, the main spring 22 is located between the inside surfaces of members 12 and 16, and the outside surfaces of fixed structures 18 and member 40. Main spring 24 is located between the inside surfaces of members 14 and 16, and the outside surfaces of fixed structure 20 and member 40. The main springs are wound and ground to have an interference fit with the outside surfaces of the associated fixed structure and member 40, that is, the main springs are normally maintained in a slightly expanded condition by contact with these surfaces. The normal outside diameter of the springs 22 and 24 in their assembled positions is somewhat less than the diameter of the inside surfaces of the input members 12 and 14, and of output member 16 so that there is normally a clearance between such surfaces and the spring.

One end of main spring 22 is rotationally fixed with respect to the output member 16 by the tang 48 which is lodged in a recess in the member. The other end of the spring 22 is engaged by a lug 50 on a ring member 52 encircling fixed structure 18 and contacting surface 36. Similarly, one end of main spring 24 is rotationally fixed with respect to output member 16 by the tang 54 lodged in the member. The other end of spring 24 is engaged by a lug 56 on a ring member 58 encircling fixed structure 20 and in contact with surface 38.

In addition to the main springs 22 and 24, teaser springs 60 and 62 are provided for imparting an energizing force to the main springs 22 and 24 respectively. These teaser springs are much lighter than the main springs and much more easily energized. The teaser springs 60 and 62 fit over sleeve bearings 64 and 66 respectively with the inside surfaces of the springs 60 and 62 normally spaced somewhat from the outer surfaces of sleeve bearings 64 and 66 respectively. The sleeve bearings have substantially the same outer diameter as surfaces 36 and 38 of the fixed structures. The sleeve bearing 64 is rotatable on fixed structure 18 and the sleeve bearing 66 is rotatable on the fixed structure 20. A small clearance normally exists between the outer surface of teaser spring 60 and cylindrical surface 68 on input member 12. Similarly a corresponding clearance normally exists between the outer surface of teaser spring 62 and cylindrical surface 72 on input member 14. The outer surfaces of teaser springs 60 and 62 normally contact the inside surfaces 70 and 74 respectively of the rings 52 and 58.

One end of teaser spring 60 is secured rotationally with respect to ring member 52 by tang 76, and the other end of such spring is secured by tang 78 in a disc member 80 rotatably mounted on sleeve bearing 64. One end of the teaser spring 62 is rotationally secured with respect to ring member 58 by tang 82, whereas the other end is secured by tang 84 in a disc member 86 rotatably mounted on the sleeve bearing 66. The disc members 80 and 86 are formed with gear teeth 88 and 90 respectively on their outer periphery. As shown the disc members are interconnected to rotate together by means of gears 92 and 94 fixed on opposite ends of shaft 96, the gear 92 being in engagement with the gear teeth of disc 80 and gear 94 being in engagement with the teeth of disc 86.

The discs are normally axially spaced somewhat from ends of the input members. The discs are however axially slidable on the sleeve bearings 64 and 66, and actuating means are provided for moving one or the other of the discs into engagement with an associated input member. Such actuating means include disc members 98 and 100 which are mounted for rotation about axis 26, and for axial movement. The actuating means also includes the end members 104 and 108, and the actuating rod 110. The disc 98 is supported on ball bearings 102 located between the member 98 and end member 104, and disc 100 is supported on ball bearings 106 located between member 100 and end member 108. As shown, a rod 110 which is axially slidable on bushings 112 and 114 carries members 104 and 108 between end portions 116 and 118 of the rod and a spacer 120.

In a neutral position of the actuating means as shown in the drawing, the disc members 98 and 100 are out of contact with discs 80 and 86, and the discs are out of contact with the input members 12 and 14. If, however, the rod 110 is moved to the right as viewed in the drawing, the end member 104 acting through ball bearings 102 moves the member 98 to the right to engage disc 80. The disc 80 is also moved to the right and is pressed between member 98 and the end of input member 12. Suitable means are provided for rotating member 98 and input member 12 so that when the disc 80 is squeezed between these parts rotation of the disc ensues. Preferably, the members 98 and 12 are provided with friction surfaces to facilitate the clutching action of these parts. Such surfaces have been omitted from FIG. 1 in the interest of simplifying the drawing. Means for rotating member 12 include the gear 122 which engages a gear 124 formed on the input member. The gear 122 is one of two gears on a common shaft 126. The other gear 128 which engages gear teeth 130 on member 98 is provided for rotating the member 98 at the same speed and in the same direction as input member 12. Rotation of the member 98 by the separate gearing 128, 130 prior to the rotation of disc 80 results in reducing inertia effects occurring during the transmission of a signal through the device.

During operation of the device, the members 98 and 12 are rotated in the direction indicated. In view of the direction of rotation of these members and the manner in which the teaser spring 60 is wound, as shown, such spring is caused to unwind when the disc 80 is rotated by the input member 12 and disc member 98. This unwinding expands the spring causing it to engage the inside surface 68 of the input member 12 such that rotation is imparted to the sleeve. As the sleeve turns, lug 50 in engagement with the end of main spring causes the main spring to expand into tight engagement with inside surfaces 28 and 32 of the input and output members 12 and 16 respectively. Power then transmits through the main spring from the input member 12 to the output member 16 causing such output member to rotate in the direction of the driving input member.

Moving the rod 110 to the left from a neutral position instead of to the right produces a clutching operation similar to that already described resulting in the input member 14 driving output member 16 in an opposite direction from that in which it is driven by input member 12. Moving the rod 110 to the left causes end member 108 and member 100 to also move to the left whereupon member 100 engages the disc 86 which is pushed against input member 14. Input member 14 is rotated by means of gear 132 on shaft 134 which gear engages a gear 136 on input member 14. A gear 138 on shaft 134 engages gear teeth 140 on member 100 to drive this member at the same speed and in the same direction as input member 14. The direction of rotation of input member 14 and member 100 is opposite to that of input member 12 and member 98, suitable means including the idler 142 shown in FIG. 2 being provided for producing the desired direction of rotation. When the disc 86 engages input member 14 it is therefore driven in an opposite direction from the disc 80.

All springs including the teaser springs 60 and 62 are wound in the same direction as shown in the drawing. Accordingly as the disc 86 is rotated by input member 14 teaser spring 62 is caused to unwind and expand into contact with surface 72. The lug 56 on sleeve 58 acts against the end of main spring 24 causing the main spring to unwind and to expand against surfaces 30 and 34. The input member 14 then becomes effective to drive output member 16 through the spring 24 in a direction opposite to that in which it is driven by the input member 12.

While the output member 16 is driven by either one of the input members through the main spring associated with such input member, the other main spring overruns. This is due to the fact that the main springs are wound in the same direction, with the result that when the output member is actuated to rotation through one main spring such output member acts upon the other main spring causing it to release its grip slightly on the fixed structure about which it is wound allowing it to be rotated by the output member. At such time, the teaser spring associated with the overrunning main spring and the attached sleeve are also rotated at the speed and in the same direction as the output member and main spring. The rotation of the teaser spring is due to the interconnection between the discs 80 and 86, such interconnection including the shaft 96 and gears 92 and 94 in engagement with gear teeth 88 and 90 respectively on the discs.

As noted when the actuating means are moved from neutral into a position to the right as viewed in the drawing, the disc 80 is set into rotation by the input member 12 and disc member 98. The disc 86 is, however, also set into rotation through the said interconnection between the discs at the same speed and in the same direction as disc 80. Although the disc 80 unwinds teaser spring 60, disc 86 winds teaser spring 62 tightening such spring on the sleeve bearing 66. Clearances above and below the teaser springs and above the main springs are such that either teaser spring and its associate main spring complete their unwinding to provide a driving connection between an input member and the output member 16 at substantially the same time as the other teaser spring finishes winding up on the bushing under it. Due to the rotation of the disc 86 the teaser spring 62, sleeve bushing 66 and the sleeve 58 are all caused to rotate. The other teaser spring 60, sleeve bearing 64 and sleeve 52 are rotated in a similar manner when the actuating means occupies a leftward position.

The interconnection between the discs serves a particularly important function in preventing double clutch engagement, that is, in preventing the device from operating in a manner tending to drive the output member in two different directions at the same time. Assuming that a change in the direction of rotation by output member 16 is desired, it becomes necessary to disengage one of the discs 80 or 86 from input member 12 or 14 respectively, and to engage the other disc with the other input member. Any tendency of the one disc to stick to the associated input member could result in double clutch engagement, as mentioned. This is prevented, however, by the interconnection between discs since rotation imparted to one disc upon engagement with an input member is transmitted through the interconnection to the other disc which is caused to rotate in a direction tending to release the connected teaser spring from clutching action with the associated input member.

When the rod 110 and actuating means are in neutral positions and discs 80 and 86 are both out of contact with the input members, the output member 16 is prevented from moving by the main springs. As already noted one end of each of the springs is lodged in the output member, and since both springs are wound in the same direction, any negative torque applied to the output gear will tend to wind up one spring and unwind the other. The particular spring wound or unwound will depend upon the direction of such negative torque. The friction of the spring 22 or 24 around the fixed structures 18 or 20 respectively prevents the spring being wound from slipping.

Suitable connecting elements appearing in FIG. 1 which are now to be described are contemplated for incorporating the described transmission device in a closed loop system. As shown, the rod 110 is connected by means of pin 144 and slot 146 to one end of a lever 148. An intermediate point on the lever 148 is connected by pin 150 and slot 152 to a screw operated member 154. The other end of lever 148 is pin connected at 156 to a lever 158 which is pin connected at an intermediate point 160 to a fixed member 162. The lever 158 includes a gear sector 164 engaged by actuating gear 166. The member 154 has internal threads which are engaged by threads 168 on the end of a shaft 170 carrying a gear 172 in engagement with a gear 174 formed on output member 16.

The gear 174 is subject to being rotated in the manner of output member 16 as described hereinbefore in response to a command signal actuating gear 166. Upon occurrence of such a signal producing rotation of gear 166, lever 158 is caused to pivot about point 160. The lever 148 is moved with respect to the pin 150 on member 154 which momentarily may be considered fixed in position. The rod 110 is moved by the lever 148 to the right or left according to the direction of rotation of gear 166. This results in rotation of the output gear 174 of the transmission device in a direction depending upon the direction in which the rod 110 was moved. The output gear 174 rotates the gear 172 which in turning rotates shaft 170. One end of the shaft may be connected to means utilizing the output of the device. The other end is screw connected with the member 154. By means of such screw connection the output signal of the device is fed back to the link 148. The link 148 is pivoted by this signal about point 156 in a direction tending to counteract the movement initiated by the command signal actuating the transmission device.

For purposes of clarity the described closed loop system is shown in the block diagram of FIG. 2 which clearly illustrates the points of application of the input signal, the error signal and the input power, and also indicates the location at which the output of the system is available.

While only one form of the transmitting device and one embodiment for such device incorporating the features of the invention has been described it will be obvious to those skilled in the art that various changes and modifications may be made to the described device and embodiment within the scope of the invention. The appended claims are presented to cover all such changes and modifications.

We claim:

1. A power transmitting device comprising, actuating means having a neutral position and alternate other positions, fixed means, a pair of input members to rotate in opposite directions, a rotatable output member, first and second spring means selectively operable by the output member in the neutral position of said actuating means to lock the output member to the fixed means and prevent rotation of the output member in one direction or another, and means acting upon one of the spring means in one of the alternate positions of the actuating means and upon the other spring means in the other alternate position to lock the output member to one or the other of the input members and thereby impart rotation to the output member in one direction or another.

2. A power transmitting device comprising, actuating means having a neutral position and alternate other positions, fixed means, a pair of input members to rotate in opposite directions, a rotatable output member, first and second spring means selectively operable by the output member in the neutral position of said actuating means to lock the output member to the fixed means and prevent rotation of the output member in one direction or another, a first rotationally mounted member actuated to rotation by rotation of one input member in one of the alternate positions of the actuating means, and a second rotationally mounted member actuated to rotation by rotation of the other input member in the other of the alternate positions of the actuating means, said first member upon actuation by the one input member being effective to energize the first spring means and thereby lock the output member to said one input member, said second member upon actuation by the other input member being effective to energize the second spring means and thereby lock the output member to the said other input member.

3. The combination as defined in claim 2 with the addition of means interconnecting said first and second rotationally mounted members such that rotation of one such member is followed by rotation of the other member in the same direction.

4. A power transmitting device comprising, actuating means having a neutral position and alternate other positions, fixed means, a pair of input members to rotate in opposite directions, a rotatable output member, first and second spring means selectively operable by the output member in the neutral position of said actuating means to lock the output member to the fixed means and prevent rotation of the output member in one direction or another, first and second rotationally mounted members, first means responsive to said actuating means for disposing the first rotationally mounted member in engagement with one input member for rotation thereby in one of the alternate positions of the actuating means, second means responsive to the actuation means for disposing the second rotationally mounted member in engagement with the other input member for rotation thereby in the other alternate position of the actuating means, said first member upon actuation by the one input member being effective to energize the first spring means and thereby lock the output member to said one input member, said second member upon actuation of the other input member being effective to energize the second spring means and thereby lock the output member to the said other input member.

5. The combination as defined in claim 4 wherein each of the said first and second means responsive to the actuating means comprise rotationally mounted members, and means are provided for rotating the first and second means at the same speed and in the same direction as the said one and the said other input members respectively.

6. A power transmitting device comprising: actuating means having a neutral position and alternate other positions; fixed means; a pair of input members to rotate in opposite directions, each having a clutching surface; a rotatable output member; first and second spring means selectively operable by the output member in the neutral position of said actuating means to lock the output member to the fixed means and prevent rotation of the output member in one direction or another; first and second rotationally mounted discs; a first rotationally mounted member having a clutching surface for engaging the first disc; a second rotationally mounted member having a clutching surface for engaging the second disc; and means for rotating the said first and second rotationally mounted members at the same speed and in the same direction as the said one and the said other input members respectively; said first and second members and the first and second discs being axially movable by the actuating means, the clutching surface of the first member being disposed in engagement with the first disc and the first disc being disposed in engagement with the clutching surface of the one input member when the actuating means is in one of the said alternate positions, and the clutching surface of the second member being disposed in engagement with the second disc and the second disc being disposed in engagement with the clutching surface of the other input member when the actuating means is in the other of said alternate positions; said first disc being actuated by the said one input member in the said one alternate position of the actuating means to energize the first spring means and thereby lock the output member to said one input member; said second disc being actuated by the said other input member in the said other alternate position of the actuating means to energize the second spring means and thereby lock the output member to the said other input member.

7. The combination as defined in claim 6 with the addition of means interconnecting said discs such that rotation of one such disc is followed by rotation of the other disc in the same direction.

8. In a power transmitting device, the combination comprising a rotating input member having a clutching surface, a rotatable output member, a rotationally mounted disc, spring means responsive to rotation of the disc, and a rotationally mounted member having a clutching surface thereon for engaging the disc, said rotationally mounted member and the disc being axially movable and disposable with the clutching surface of said rotationally mounted member in engagement with the disc and with the disc in engagement with the clutching surface of the input member, said disc being rotated when such clutching action occurs to energize the spring means and thereby lock the output member to said input member.

9. The combination as defined in claim 8 with the addition of means for rotating said rotationally mounted member at the same speed and in the same direction as said input member.

10. In a power transmitting device, the combination comprising a rotating input member, a disc axially movable with respect to the input member, a sensitive actuating spring connected with the disc, means for moving the disc into engagement with the input member whereby the disc is rotated to cause said actuating spring to engage the input member for rotation thereby, an output member, and a main driving spring operated in response to rotation of the actuating spring for engaging the input and output members whereby the output member may be rotated by the input member through the main spring.

11. A power transmitting device comprising, actuating means having a neutral position and an operating position, fixed means, a rotatable input member, a rotatable output member, spring means operable by the output member in the neutral position of said actuating means to lock the output member to the fixed means and prevent rotation of the output member, means acting upon the spring means in the operating position of the actuating means to lock the output to the input member and thereby impart rotation to the output member, and mechanical means directly connecting the output member to the actuating means to continuously provide a feed-back signal from the output member to the actuating means during periods of rotation of said output member.

References Cited in the file of this patent
UNITED STATES PATENTS

| | | |
|---|---|---|
| 745,763 | Barlow | Dec. 1, 1903 |
| 1,910,319 | Brownlee | May 23, 1933 |
| 2,336,757 | Starkey | Dec. 14, 1943 |
| 2,446,064 | Smith | July 27, 1948 |
| 2,457,241 | Klein | Dec. 28, 1948 |
| 2,487,280 | Starkey | Nov. 8, 1949 |
| 2,575,012 | Harvey | Nov. 13, 1951 |
| 2,758,685 | Sisson | Aug. 14, 1956 |
| 2,885,042 | Frechette | May 5, 1959 |
| 2,885,896 | Hungerford | May 12, 1959 |